United States Patent [19]
Noda

[11] 4,070,434
[45] Jan. 24, 1978

[54] METHOD OF MANUFACTURING HOLLOW PLASTIC BALL

[75] Inventor: Jiseki Noda, Kawasaki, Japan

[73] Assignee: Nihon Nodalon Co., Ltd., Tokyo, Japan

[21] Appl. No.: 751,710

[22] Filed: Dec. 17, 1976

Related U.S. Application Data

[63] Continuation of Ser. No. 562,031, March 25, 1975, abandoned, which is a continuation-in-part of Ser. No. 448,046, March 3, 1974, abandoned, which is a continuation-in-part of Ser. No. 207,770, Dec. 14, 1971, abandoned.

[30] Foreign Application Priority Data

Dec. 14, 1070 Japan .................................. 45-111461

[51] Int. Cl.² .......................... A63B 41/00; B29C 5/04

[52] U.S. Cl. ..................................... 264/255; 137/223; 264/278; 264/310; 273/65 C; 273/65 D

[58] Field of Search ............... 264/255, 275, 278, 310; 137/223; 273/65 C, 65 D

[56] References Cited

U.S. PATENT DOCUMENTS 2,934,344  4/1960  Chupa ............................. 137/223 X
3,017,670  1/1962  Zweig ................................. 264/255
3,160,691  12/1964  Chupa ................................. 264/310

Primary Examiner—Thomas P. Pavelko
Attorney, Agent, or Firm—Wenderoth, Lind & Ponack

[57] ABSTRACT

A method of manufacturing a hollow polyvinyl chloride resin ball. An inflating valve contained in the ball body is made of a plastisol composed mainly of polyethylene-vinyl acetate copolymer and acrylonitrile copolymer. The inflating valve prevents widening of the hole pierced therethrough and maintains an internal air pressure for a long period.

4 Claims, 4 Drawing Figures

FIG. 1
FIG. 2
FIG. 3
FIG. 4
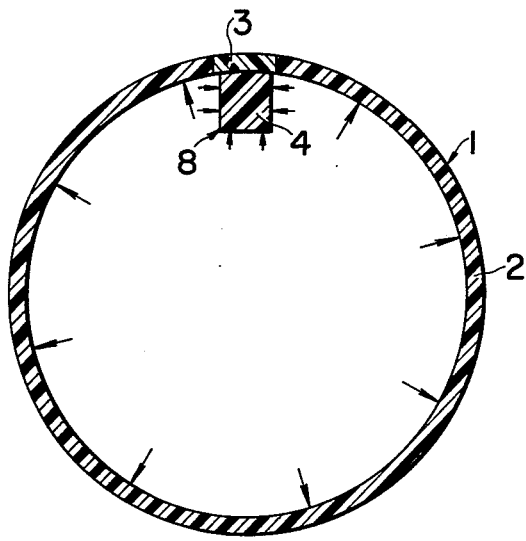
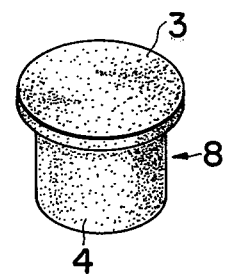
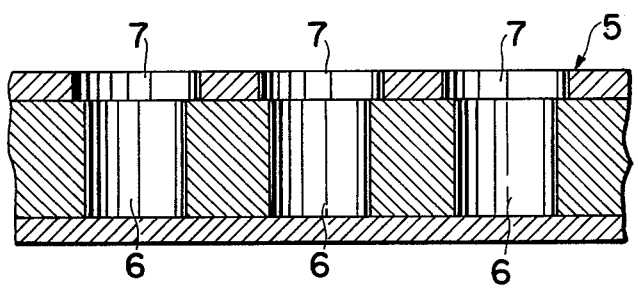
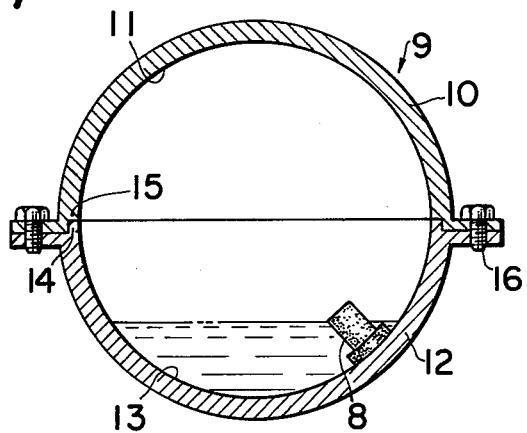

METHOD OF MANUFACTURING HOLLOW PLASTIC BALL

CROSS-REFERENCE TO RELATED APPLICATION

This is a continuation of application Ser. No. 562,031, filed Mar. 25, 1975, now abandoned, which is a continuation-in part application of application Ser. No. 448,046 filed Mar. 3, 1974, now abandoned which in turn is a continuation in part of application Ser. No. 207,770, filed Dec. 14, 1971, now abandoned.

BACKGROUND OF THE INVENTION

The present invention relates to a hollow plastic playing ball, and more particularly to a method of manufacturing a hollow polyvinyl chloride ball having an inflating valve so as to maintain an internal pressure for a long period.

Heretofore, there are various methods of manufacturing a hollow plastic playing ball by using polyvinyl chloride resin. Particularly, there is a well-known method of manufacturing an air-inflatable article having a valve therewith, in which said valve is firstly made of polyvinyl chloride resin containing a relatively large amount of a plasticizer and placed in a hollow metal mold and then a polyvinyl chloride resin paste for the article body is poured into the mold and thereafter the resulting body and the valve are integrally secured to each other. This valve has such a function that a leakage of air is prevented from the inside of the article after the air is filled in the inside of the ball through the valve by an air injection needle. However, the plasticizer contained in the valve penetrates into the body within some days after the molding, so that after the air injection needle is removed from the body, the size of the resulting pierced hole gradually increases and further the elasticity of the article is reduced. As a result, the air filled in the body gradually leaks out from the inside of the body through the pierced hole and the ball is deflated. Thus, the deflated article is worthless in the market and results in an economically serious loss.

SUMMARY OF THE INVENTION

Therefore, an object of the present invention is to provide a method of manufacturing a hollow plastic playing ball which maintains a sufficient internal air pressure for a long period of time.

Another object of the present invention is to provide a method of manufacturing a hollow polyvinyl chloride ball having an inflating valve therewith, in which the inflating valve has no trace of hole pierced by an air injection needle after the needle is removed from the ball body through the valve.

The above-mentioned objects are accomplished by a method of manufacturing a hollow polyvinyl chloride ball having an inflating valve therewith wherein the valve is firstly made of polyvinyl chloride resin and placed in a hollow metal mold and then a polyvinyl chloride resin paste for the ball body is poured into the mold and thereafter the resulting ball body and the valve are integrally secured to each other, an improvement which comprises using a plastisol composed mainly of 20 to 80 parts by weight of polyethylene-vinyl acetate copolymer for the formation of said inflating valve and pouring said plastisol into a mold and then gelating it to form the inflating valve.

The polyethylene-vinyl acetate copolymer is used in powdery form and the acrylonitrile copolymer is used in a liquid form. The quantitative relation between the two copolymers is based on the recognition that if the amount of polyethylene-vinyl acetate copolymer is increased based on the amount of acrylonitrile copolymer, the addition of the former copolymer is more effective, but if the amount of the former copolymer exceeds the given range, it is difficult to form the inflating valve. That is, when the amount of polyethylene-vinyl acetate copolymer is less than 20 parts by weight, the tackiness of the resulting inflating valve caused by the addition of polyethylene-vinyl acetate copolymer is lost and leakage of air is caused through a hole pierced in the inflating valve by an air injection needle, while when said amount is more than 80 parts by weight, the mixture of polyethylene-vinly acetate copolymer and acrylonitrile copolymer cannot be maintained in a plastisol form and it is impossible to produce the inflating valve from the mixture in a given mold. The preferred amount of polyethylene-vinyl acetate copolymer used is 20 to 40 parts by weight based on 100 to 150 parts by weight of acrylonitrile copolymer. If necessary, the plastisol may contain a plasticizer and a stabilizer.

The inflating valve consists of a valve body and a seat and is manufactured by pouring the plastisol composed of polyethylene-vinyl acetate copolymer and acrylonitrile copolymer into a mold of a given shape and gelating it. Next, the thus obtained inflating valve is placed in a hollow metal mold and then a polyvinyl chloride resin paste for the ball body is poured and gelated in the mold, during which the valve body and the seat are maintained in position, whereby the resulting ball body and the seat are integrally secured to each other so as to form a hollow polyvinyl chloride ball.

When air is filled in the inside of the thus obtained ball through the inflating valve by means of an air injection needle, the hole pierced by removing the needle from the inflating valve is immediately closed due to not only the action of internal pressure on the inflating valve but also the tackiness of the valve body caused by the addition of polyethylene-vinyl acetate copolymer. Thus, the closing of the pierced hole is almost perfectly performed. Furthermore, the pierced hole is not widened because the seat of the inflating valve is relatively hard. The method according to the present invention is relatively simple and the production time is substantially equal to or shorter than that of the above described prior art.

Other objects, advantages and details of the invention will be apparent as the description proceeds, reference being had to the accompanying drawings wherein a preferred form to realize the method according to the invention is shown. It will be understood, however, that the description and drawings are illustrative only, and that the scope of the invention is to be measured by the appended claim.

BRIEF DESCRIPTION OF THE DRAWINGS

FIG. 1 is a longitudinal sectional view of the plastic ball according to the present invention;

FIG. 2 is an enlarged perspective view of an inflating valve constituting a part of the ball shown in FIG. 1;

FIG. 3 is a longitudinal sectional view of a metal mold to form the inflating valve shown in FIG. 2; and FIG. 4 is a longitudinal sectional view of another metal mold to form the ball shown in FIG. 1 wherein the inflating valve shown in FIG. 2 is adhered to the wall thereof.

DESCRIPTION OF THE PREFERRED EMBODIMENTS

A hollow polyvinyl chloride ball 1 according to the present invention comprises a ball body 2 made of polyvinyl chloride resin and an inflating valve 8 adhered thereto as shown in FIG. 1. The inflating valve 8 consists of a seat 3 and a valve body 4 shown in FIG. 2 and is made from a plastisol composed of polyethylene-vinyl acetate copolymer and acrylonitrile copolymer. Thus, the hollow ball 1 can be inflated by piercing an air injection needle (not shown) through the inflating valve, i.e., the seat 3 and the valve body 4.

The inflating valve 8 has sufficient tackiness to cause the walls of the pierced hole due to stick together due to the presence of polyethylene-vinyl acetate copolymer, so that the leakage of air through the hole is effectively prevented.

Experiment 1

The adaptability of acrylonitrile copolymer as a plasticizer with polyethylene-vinyl acetate copolymer is examined as compared with conventional plasticizers.

10 parts of a plasticizer as shown in the following table was mixed with 3 parts of Soablene 21 (Trade Mark: polyethylene-vinyl acetate resin) and the resulting mixture was left to stand for 10 hours to test whether it will solidify or not.

| Plasticizer | Solidification |
| --- | --- |
| DBP dibutyl phthalate | solidified |
| BPBG butyl phthalyl butyl glycolate | solidified |
| DHP diheptyl phthalate | solidified |
| DOP dioctyl phthalate | solidified |
| DIDP diisodecyl phthalate | solidified |
| DTDP ditridecyl phthalate | solidified |
| BBP butyl benzyl phthalate | solidified |
| TCP tricresyl phthalate | solidified |
| DOA dioctyl adipate | solidified |
| chlorinated paraffin | solidified |
| acrylonitrile copolymer | not solidified |

Thus, it is clear from the above table that acrylonitrile copolymer mixed with the base resin is not solidified. For production purposes, it is very important that polyethylene-vinyl acetate resin copolymer mixed with acrylonitrile copolymer can be safely handled as a liquid resin sol to pour into a mold to be cured.

| Composition A for valve body: | (parts by weight) |
| --- | --- |
| acrylonitrile copolymer plasticizer | 120 |
| dioctyl adipate | 100 |
| polyethylene-vinyl acetate resin copolymer | 30 |
| migrating plasticizer (liquid paraffin chloride) | 50 |
| epoxy resin | 10 |
| polyvinyl chloride resin paste | 10 |

The plastisol described in the composition A has a very low viscosity just after the mixing. The viscosity increases to some extent in about 3 hours, and thereafter is substantially constant, so that the plastisol can be safely handled as ordinary resin sol.

As shown in FIG. 1, a valve body 4 for the inflating valve is first prepared from the plastisol having the composition A. Then, a seat 3 is provided and attached to the valve body 4.

Some examples of the composition of the seat are as follows:

| Composition B: | (parts by weight) |
| --- | --- |
| polyvinyl chloride resin paste | 100 |
| plasticizer (dioctyl adipate) | 30 |
| plasticizer (dibutyl phthalate) | 35 |
| Stabilizer (liquid epoxy resin) | 3 |

| Composition C: | (parts by weight) |
| --- | --- |
| polyvinyl chloride resin paste | 75 |
| plasticizer (dioctyl phthalate) | 30 |
| plasticizer (dibutyl phthalate) | 20 |
| stabilizer (calcium stearate) | 1 |

To manufacture the valve body 4 integrally secured to the seat 3 shown in FIG. 2, a metal mold 5 shown in FIG. 3 can be used. The metal mold 5 has many openings including valve body forming cavities 6 having, for example, a diameter of 9 mm and a height of 10 mm, and seat forming cavities 7 having, for example, a diameter of 10 mm and a height of 1.5 mm, the cavity 7 is aligned with cavity 6 as shown.

In the cavities 6 the plastisol having the composition A is poured and in the cavities 7 the plastisol having the composition B or C is poured. The mold 5 filled with the material heated in suitable heating chamber at about 160° C for about 15 minutes. The plastisol filled in the cavities 6 and 7 is gelated to form an inflating valve 8 shown in FIG. 2. The formed inflating valve 8 consists of highly tacky valve body portion 4 and relatively hard and stiff seat portion 3.

To manufacture the inflating valve 8, another method can be utilized. At first, only the plastisol for the seat portion 3 is poured into a suitable mold (not shown) and heated in a heating chamber at about 120° C for about 5 minutes to gelate said portion. Then, the plastisol for the valve body portion 4 is poured on the gelated seat and heated at about 140° C for about 15 minutes to gelated this plastisol so as to form the inflating valve 8.

The formed inflating valve 8 is secured on the inside surface of a spherical mold for forming a hollow plastic ball by suitable adhesive. The spherical mold may be any suitable mold, one example of which is schematically illustrated in FIG. 4. The spherical mold 9 shown in FIG. 4 comprises an upper mold half 10 having a half spherical inner surface 11 and a lower mold half 12 having also a half spherical inner surface 13. The upper and lower mold halves 10 and 12 are secured to each other by means of suitable aligning means such as shoulder and recess 14 and 15 shown in FIG. 4, and can be releasably secured by suitable fastening means such as bolts 16.

As the first step of ball forming, the inflating valve 8 is secured in position on one of the inner surfaces 11 or 13. The adhesive that secured the inflating valve 8 must have sufficient initial adhesion to maintain the inflating valve 8 in place with the ball forming process takes place. Also the adhesive must be easily removed from the mold surface after the ball materials are heated and gelated. The adhesive comprises polyvinyl chloride resin having added thereto a suitable sticky component such as synthetic rubber.

Some examples of the adhesive to secure the inflating valve 8 are as follows:

| Composition D: | (parts by weight) |
|---|---|
| polyvinyl chloride paste resin | 100 |
| plasticizer (TCP tricresyl phosphate) | 30 |
| plasticizer (DBP dibutyl phthalate) | 22 |
| acrylonitrile-styrene copolymer | 9 |
| epoxy resin (liquid) | 2 |

| Composition E: | (parts by weight) |
|---|---|
| vinyl acetate resin | 60 |
| plasticizer (DOP dioctyl phthalate) | 60 |
| (The two components are mixed and solvent is evaporated in a vacuum chamber at about 60° C.) | |
| polyvinyl chloride resin | 100 |
| epoxy resin (liquid) | 3 |

The adhesive of the composition D or E is coated on the seat 3 of the inflating valve 8 and the inflating valve 8 is adhered to the inner surface 13 of the lower mold half 12 of the mold 9, as shown in FIG. 4.

Then, suitable resin plastisol is poured in the mold. One example of the composition of resin plastisol to form ball body 2 shown in FIG. 1 is as follows:

| Composition F: | (parts by weight) |
|---|---|
| polyvinyl chloride paste resin | 100 |
| plasticizer (DOP dioctyl phthalate) | 70 |
| stabilizer (barium stearate) | 1 |
| stabilizer (calcium stearate) | 1 |
| coloring agent (e.g. pink) | 1 |

After the resin plastisol of the composition F is poured into the mold 9, the mold halves 11 and 13 are closed and secured by means such as bolts 16. Then the mold is heated at about 140° C for about 20 minutes while the mold is rotated laterally and longitudinally. After the mold is cooled the mold halves are separated and the gelated and formed plastic ball is removed from the mold.

In the formed ball 1, an air injection needle is inserted through the seat 3 and valve body 4, i.e., the inflating valve 8 and air is pumped into the ball. The pierced hole formed by the air injection needle is closed due to not only the action of internal pressure on the inflating valve 8 as shown by arrows in FIG. 1 but also the tackiness of the valve 8 caused by the addition of polyethylene-vinyl acetate copolymer. Due to the presence of the relatively hard seat 3, the acrylonitrile copolymer of the plasticizer in the valve body 4 does not contact the ball body 2, and also the pierced hole does not widen although the ball body 2 expands somewhat during the air filling process.

In one experiment, a plastic ball made according to the invention is compared with a plastic ball made by the usual process.

Experiment 2

Sample:
A: plastic ball having the usual valve
B: plastic ball having a valve according to the invention Condition: In the Samples A and b the balls are filled by air at the same pressure by an air injection needle. Then a hole of about 7 mm diameter is pierced by a thick needle through each valve of the samples and dense soap-suds are dropped on the pierced hole.

Result: In Sample A, small air bubbles appeared at the hole. As to Sample B, no bubbles appeared.

In practical use, without special piercing, the average time over which internal pressure is maintained in the conventional balls is about 3 months. On the contrary, the maintenance of pressure in balls according to the invention is considerably more than 6 months.

What is claimed is:

1. In a method of manufacturing a hollow polyvinyl chloride ball having an inflating valve therein and which has a valve body and a valve seat and wherein the valve body and valve seat firstly are sequentially molded of resins containing polyvinyl chloride and are integrally joined and placed in a hollow metal mold with the valve seat on the mold surface and the valve body projecting into the mold and then a polyvinyl chloride resin paste for the ball body is poured into the mold and thereafter the resulting ball body and the valve seat are integrally secured to each other, the improvement which comprises, in the step of molding the inflating valve, using a plastisol composed mainly of 20 to 80 parts by weight of polyethylene-vinyl acetate copolymer and 100 and 150 parts by weight of acrylonitrile copolymer for the formation of said inflating valve body and pouring said plastisol into a valve body mold for filling the mold only with the plastisol and then gelating it to form the inflating valve body, whereby a hole pierced in said valve body by an air injection needle inserted through the valve seat and the valve body is closed when the needle is withdrawn not only due to the action of internal pressure on the inflating valve, but also to the tackiness of the material of the valve body.

2. The improvement as claimed in claim 1 wherein the amount of polyethylene-vinyl acetate copolymer is 30 to 40 parts by weight.

3. The improvement as claimed in claim 1 wherein said plastisol is poured into the valve body mold, a resin consisting of substantially all polyvinyl chloride and plasticizer is poured into a valve seat mold positioned over the valve body mold, and the valve seat and valve body are gelated to form the inflating valve.

4. The improvement as claimed in claim 1 wherein a resin consisting of substantially all polyvinyl chloride and plasticizer is poured into a valve seat mold and gelated, and the valve body mold is placed over the valve seat mold and said plastisol is poured into the valve body mold and gelated.

* * * * *